UNITED STATES PATENT OFFICE.

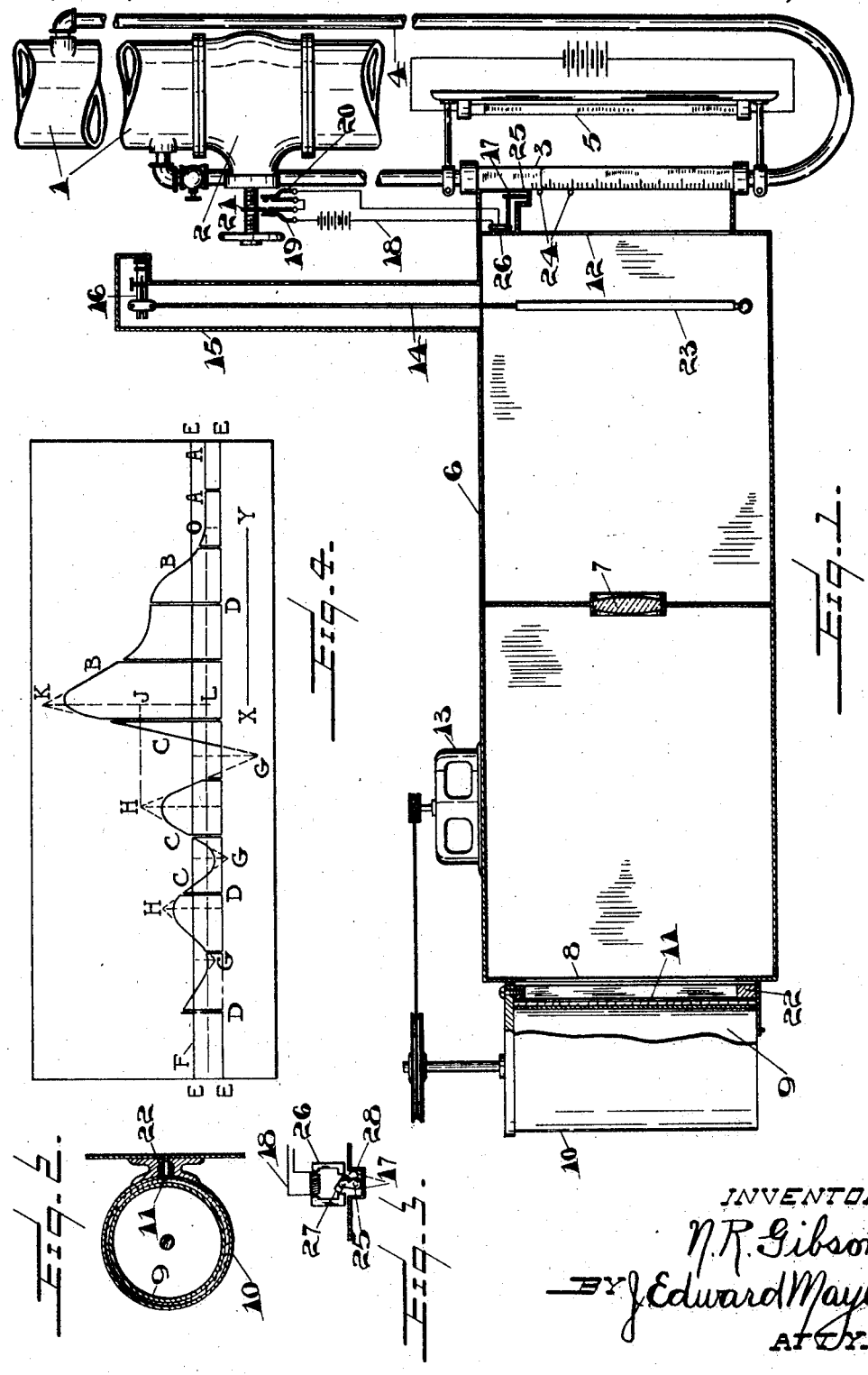

NORMAN R. GIBSON, OF NIAGARA FALLS, ONTARIO, CANADA.

APPARATUS FOR OBTAINING PRESSURE TIME DIAGRAMS.

1,394,001.   Specification of Letters Patent.   Patented Oct. 18, 1921.

Application filed October 13, 1919. Serial No. 330,372.

*To all whom it may concern:*

Be it known that I, NORMAN R. GIBSON, of the city of Niagara Falls, in the county of Welland, Province of Ontario, Canada, have invented certain new and useful Improvements in Apparatus for Obtaining Pressure Time Diagrams, of which the following is a specification.

In the present invention, my object is to devise apparatus specially adapted to graphically record with reference to time the variations in pressure, which occur in a closed conduit when the flow of fluid therein is interrupted, and the time taken to effect complete stoppage, for the purpose of calculating the velocity of the flow in said conduit according to the process set forth in my co-pending application No. 278000 filed February 19th, 1919. In that application apparatus was described by which time and pressure records were independently obtained and a pressure-time curve plotted therefrom. By the use of the present apparatus a diagram is automatically produced ready for use in the process.

The apparatus is represented in the accompanying drawings in which—

Figure 1 is a diagrammatic view of the apparatus;

Fig. 2 a cross sectional detail showing the arrangement of the shutter adjacent the photograph film;

Fig. 3 a detail in end elevation of the automatically operated shutter controlling the admission of a pencil of light to the camera box; and Fig. 4 a typical time-pressure diagram produced with my apparatus.

In the drawings like numerals of reference indicate corresponding parts in the different figures.

1 is a conduit in which the fluid, the velocity of which is to be measured, is assumed to be flowing in the direction indicated by the arrow, and 2 is a valve or other suitable means for interrupting the flow of the fluid in the conduit.

The apparatus comprises three main parts, (*a*) the pressure indicating device which includes a light intercepting body, (*b*) a camera, and (*c*) means for briefly breaking the actinic record made by the camera at regular predetermined intervals of time.

The pressure indicating apparatus comprises a U-tube, the short leg 3 of which is connected with the conduit 1 at some point at the up-stream side of the valve 2. The leg 3 includes a glass tube of uniform bore and is suitably connected with the longer leg 4, which if necessary may be of smaller bore than the glass tube, so that the movement of the mercury column in the shorter leg is less than the movement in the longer leg. Thus the range of movement of the mercury in the glass tube may be kept within reasonable limits. The relative sizes of the two legs may be reversed if desired when the changes of pressure to be recorded are small. The difference in level between the tops of the mercury columns in 3 and 4 is then a measure of the pressure existing in the conduit 1.

The mercury column in the short leg is used as a light intercepting body and either daylight might be employed for illumination purposes or a suitable means of artificial illumination such as the mercury vapor lamp 5 as shown.

Opposite the U-tube is a camera box 6 containing the photographic lens 7 provided with any ordinary shutter. In the end of the camera box opposite the U-tube is a narrow slot 12 of substantially the same length as the glass tube in the short leg of the U-tube. At the other end of the box is an opening 8 to which may be applied a ground glass on which may be observed the photographic image of the tube 3 produced by the lens 7. The ground glass is for observation purposes only and is replaced by the revolving drum 9 set in a light-proof holder 10 which may be fastened to the end of the box in any suitable manner. In the side of the holder adjacent to the box there is a narrow slot 11 parallel to the slot 12, which slot may be opened or closed by means of the rotatable shutter 22, though, of course, any type of shutter by which the holder may be closed when removed from the box may be employed.

The drum 9 is revolved at uniform speed by means of a motor 13 suitably belted or otherwise connected to the drum. In practice, of course, the speed of the motor must be carefully regulated. The revolving drum 9 is adapted to carry the sensitized photographic film or other sensitive surface on which the pressure-time diagrams are to be recorded.

To break the actinic record at regular predetermined intervals of time, I provide the pendulum 14, which is supported at the upper end of a housing 15 extending up from the camera box. The pendulum will be provided with any ordinary adjustment means as indicated diagrammatically at 16. The rate of vibration of the pendulum depends, of course, on the length, and a seconds pendulum will be found satisfactory for the desired purpose.

As an adjunct to the apparatus, there may be provided a shutter 17 adapted to open and close a hole 25 opposite the upper end of the slot 12, which shutter is automatically operated to indicate on the record the times of beginning and ending of the motion of the valve 2, though the use of such a shutter is not always necessary as the times in question may be obtained by reference to the shape of the diagram made on the sensitized film. The shutter is actuated by means of an electric circuit 18 adapted to be made and broken by means of ordinary spring contacts 19—20, which lie in the path of a projection 21 connected with a movable part of the valve. The specific shutter operating mechanism is indicated more particularly in Fig. 3 and is constructed as follows.

A magnetic field 26 is connected in the circuit 18 and is provided with the rotatable armature 27, which carries the arm 17 forming the shutter. The shutter when the field coils are energized is rocked by the armature to uncover the hole 25. When the circuit is broken and the field coils deënergized, the shutter falls by gravity and again covers the hole. The movement of the shutter is limited by its contact with a stop 28 preferably formed by part of the casing of the shutter mechanism. When the shutter is opened and the film moving, a line is imprinted on the film, its ends indicating the times of opening and closing the shutter.

The method of using the apparatus is substantially as follows. The lens 7 is adjusted so that a clear image of the top of the mercury column is projected on the ground glass screen at the end of the box. The screen is removed, and the sensitized photographic film is wrapped around the drum 9, which is then placed in proper position and connected with the motor. When all is ready, the pendulum 14 is set in motion. The shutter 22 is opened, and just prior to the action of interrupting the flow the shutter of the lens 7 is opened. (In practice it may be desirable to provide pneumatic or other starting means for the pendulum and for opening the lens shutter at substantially the same time.) At this moment the flow in the conduit 1 is gradually interrupted by means of the valve 2. As the flow is being interrupted, the changes of pressure produced thereby cause the mercury column in the tube 4 to move. The amount of its motion is a measure of the changes of pressure in the conduit 1 and the motion of the top of the mercury column is photographed on the revolving film, thus providing a record of the changes of pressure that take place in the pipe as the flow is shut off. During this operation the pendulum 14 keeps swinging to and fro. The pendulum is provided with a part 23 of enlarged width, so that the light passing through the tube above the mercury is cut off at each swing of the pendulum. This causes a break in the image on the film at regular intervals corresponding to the time period of the swing of the pendulum, say, for example, a second.

After the flow has been completely shut off the oscillations of the mercury column are recorded for a few seconds. After the oscillations have ceased and quiescent conditions exist in the conduit 1, a short exposure is made to obtain a record of the static pressure in the conduit 1. The shutters are then closed, the film removed and developed and prints made, or if photographic paper has been used the paper is developed and fixed and then forms the diagram.

The result is shown on the attached typical pressure-time diagram Fig. 4. The lines A—A, B—B, C—C represent the varying levels of the top of the mercury column in the U-tube. The lines D—D are the breaks in the image at regular intervals caused by the swinging pendulum, and the lines E—E are the photograph of the cross wires 24 secured to the U-tube which are a measured distance apart and from which the scale of the diagram is determined. The line F is the record of the level of the top of the mercury column corresponding to the static pressure in the conduit 1. The diagram so obtained may be used as and for the purpose set forth in my co-pending application hereinbefore referred to. This diagram is shown inverted, rises in pressure being represented by rising curves, as this is more convenient than using it in normal position with the curve following the falling of the mercury level as the pressure rises.

If the automatic shutter 17 is employed, the line X—Y is formed on the diagram indicating the times of beginning and ending the movement of the valve. If the automatic shutter is not employed, the time of beginning and ending the motion of the valve is found from the diagram as follows. The beginning is clearly discernible at O where the pressure begins to rise and the ending is determined as follows. In the part of the diagram marked CC, showing the oscillations of the pressure in the pipe 1 (Fig. 1), after the valve has been closed, tangents to the points of inflections of the lines CC are drawn as shown and their intersections at G, G, G, and H, H, H, marked off with a pointer. The horizontal distances between G and G and H and H are equal and are fixed by the periodic vibration of the water column in pipe 1. It is not necessary to enlarge on the nature of these vibrations, but it is sufficient to say that they begin immediately after the flow in the pipe is stopped by the valve and vibrate with decreasing amplitude but the same periodicity for some considerable time. The time when the valve is completely closed is therefore obtained by measuring off the horizontal distance HH from the nearest point H to a point J such that HH equals HJ. A line perpendicular to the horizontal lines through F and A is then drawn through J and its position marks the time when the valve is completely closed. This position may be checked by drawing two tangents, one to the line C and one to the line B as shown, and it will be found that the point where they intersect at K coincides approximately with the perpendicular line through J. If it be found that the distances between the various points HH and GG are not exactly equal, they should be adjusted by inspection and trial to give the best general average. It will be found that the error here introduced is usually extremely small.

The intersection of the perpendicular line through J and the horizontal line through O is marked at L. The closing time OL is thus determined. The pressure-time diagram with which the calculations are concerned is delineated by the line O, B, B, J, L.

What I claim as my invention is:—

1. Apparatus for obtaining pressure-time diagrams comprising a pressure indicator including a light intercepting body movable to indicate pressure; a camera containing a lens and having a slot therein in front of the lens parallel to the path of said light intercepting body; means behind the lens for moving an actinically sensitive surface in the focal plane of the lens at right angles to the length of the slot; and means for briefly breaking the actinic record at regular predetermined intervals of time by eclipsing the record forming rays.

2. Apparatus for obtaining pressure-time diagrams as set forth in claim 1 in which the means for breaking the actinic record comprises a pendulum vibrating transversely of the apparatus.

3. Apparatus for obtaining pressure-time diagrams as set forth in claim 1 in which there is provided a shutter controlled opening in line with the slot; and electric shutter operating means controllable by mechanically operable circuit opening and closing means.

4. Apparatus for obtaining pressure-time diagrams as set forth in claim 1 in which a U-tube, containing mercury, is employed as a pressure indicator, one leg being formed of glass and located in front of the camera slot.

Signed at Niagara Falls this 23rd day of September, 1919.

NORMAN R. GIBSON.

Witnesses:
F. C. McBURNEY,
GERTRUDE PATTERSON.